United States Patent
Patrikios et al.

(10) Patent No.: US 8,950,458 B2
(45) Date of Patent: Feb. 10, 2015

(54) SYSTEM AND METHOD FOR MOUNTING ULTRASONIC TOOLS

(75) Inventors: Michael Patrikios, Milford, CT (US); Robert S. Soloff, Woodbury, CT (US); Sigfredo Vargas, Sr., Waterbury, CT (US)

(73) Assignee: Sonics & Materials Inc., Newtown, CT (US)

( * ) Notice: Subject to any disclaimer, the term of this patent is extended or adjusted under 35 U.S.C. 154(b) by 260 days.

(21) Appl. No.: 13/458,195

(22) Filed: Apr. 27, 2012

(65) Prior Publication Data
US 2013/0284379 A1 Oct. 31, 2013

(51) Int. Cl.
*B32B 37/00* (2006.01)
*B29C 65/08* (2006.01)

(52) U.S. Cl.
CPC ............. *B29C 65/085* (2013.01); *B29C 65/087* (2013.01)
USPC .................................... 156/580.2; 156/580.1

(58) Field of Classification Search
USPC ........... 156/73.1, 580.1, 580.2; 264/442, 443, 264/444, 445; 425/174.2; 228/110.1, 1.1; 310/323.01, 323.18
See application file for complete search history.

(56) References Cited

U.S. PATENT DOCUMENTS

| | | | |
|---|---|---|---|
| 5,772,100 A * | 6/1998 | Patrikios | 228/1.1 |
| 5,976,316 A | 11/1999 | Mlinar et al. | |
| 6,547,903 B1 | 4/2003 | McNichols et al. | |
| 6,613,171 B2 | 9/2003 | McNichols et al. | |
| 6,676,003 B2 | 1/2004 | Ehlert et al. | |
| 7,980,536 B2 * | 7/2011 | Haregoppa et al. | 267/137 |
| 8,082,966 B2 | 12/2011 | Short | |
| 8,113,258 B2 | 2/2012 | Patrikios et al. | |
| 2003/0111156 A1 | 6/2003 | McNichols et al. | |
| 2005/0284912 A1 | 12/2005 | Zhai et al. | |
| 2011/0220292 A1 | 9/2011 | Short | |

FOREIGN PATENT DOCUMENTS

JP 2001038291 A 2/2001

* cited by examiner

*Primary Examiner* — James Sells
(74) *Attorney, Agent, or Firm* — St. Onge Steward Johnston & Reens LLC

(57) ABSTRACT

An ultrasonic tool having a sonotrode having a single weld region and two nodal regions formed on either side of the weld region. Two rigid mount boosters are each coupled to either side of the weld region. One transducer is coupled to one of the rigid mount boosters. Two ultrasonic stack mounting rings are each configured to be coupled to a housing assembly at a non-nodal region and coupled to one of the rigid mount boosters at a nodal region.

18 Claims, 4 Drawing Sheets

SYSTEM AND METHOD FOR MOUNTING ULTRASONIC TOOLS

FIELD OF THE INVENTION

The present invention relates generally to an ultrasonic vibration tool, and more specifically, relates to the mounting of a vibration tool between two rigid nodal mount boosters.

BACKGROUND OF THE INVENTION

Ultrasonic welding is an industrial process involving high-frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Vibrations are introduced along the joint being welded.

Ultrasonic welding systems typically include the following components: (i) a press to apply pressure to the two parts to be assembled under pressure; (ii) a nest or anvil where the parts are placed for allowing high frequency vibrations to be directed to the interfaces of the parts; (iii) an ultrasonic stack that includes a converter or piezoelectric transducer for converting the electrical signal into a mechanical vibration, an optional booster for modifying the amplitude of the vibration (it is also used in standard systems to clamp the stack in the press), and a sonotrode or horn for applying the mechanical vibration to the parts to be welded; (iv) an electronic ultrasonic generator or power supply delivering a high power AC signal with a frequency matching the resonance frequency of the stack; and (v) a controller for controlling the movement of the press and the delivery of the ultrasonic energy.

A power supply provides high-frequency electrical power to the piezoelectric-based transducer, creating a high-frequency mechanical vibration at the end of the transducer. This vibration is transmitted through the booster section, which may be designed to amplify the vibration, and is then transmitted to the sonotrode, which transmits the vibrations to the workpieces. The workpieces, usually two thin sheets of metal in a simple lap joint, are firmly clamped between the sonotrode and a rigid anvil by a static force. The top workpiece is gripped against the moving sonotrode by a knurled pattern on the sonotrode surface. Likewise, the bottom workpiece is gripped against the anvil by a knurled pattern on the anvil. The ultrasonic vibrations of the sonotrode, which are parallel to the workpiece surfaces, create the relative friction-like motion between the interface of the workpieces, causing the deformation, shearing, and flattening of surface asperities. Welding system components, commonly referred to as the transmission line or "stack", are typically housed in an enclosure case that grips the welding assembly at critical locations (most commonly the anti-node) so as to not dampen the ultrasonic vibrations, and to provide a means of applying a force to and moving the assembly to bring the sonotrode into contact with the workpieces and apply the static force.

A number of parameters can affect the welding process, such as ultrasonic frequency, vibration amplitude, static force, power, energy, time, materials, part geometry, and tooling. With regard to tooling, which includes the sonotrode, welding tip, and the anvil, these components support the parts to be welded and transmit ultrasonic energy and static force. The welding tip is usually machined as an integral part of a solid sonotrode. The sonotrode is exposed to ultrasonic vibrations and resonates in frequency as "contraction" and "expansion" x times per second, with x being the frequency. The shape of the sonotrode (round, square, with teeth, profiled, etc), depends on the quantity of vibratory energy and a physical constraint for a specific application. Sonotrodes are made of titanium, aluminum or steel. For an ultrasonic welding application, the sonotrode provides energy directly to the welding contact area with little diffraction. This is particularly helpful when vibrations propagation could damage surrounding components.

There are typically two methods of mounting any ultrasonic horn, nodal and non-nodal mounting. A node is a portion of the horn that is not moving in one or more directions. With a nodal mount the horn can be held or grasped rigidly. Non-nodal mounts require some flexible elements because the horn surface is moving (vibrating). Because of the difficulties of handling the vibrations, non-nodal mounts are typically not used in the industry. Nodal mounts typically have a flange machined at a node, or a series of set-screws positioned radially around the node.

U.S. Pat. No. 8,082,966 to Short discloses an ultrasonic welding assembly comprising a sonotrode having a single weld region and two nodal regions formed on either side of the welding region. A transducer is connected to the sonotrode with a diaphragm spring disposed between the transducer and the sonotrode. Diaphragm springs are connected to low-friction bearings that are bolted to linear guides. The sonotrode floats under high loads limiting the dampening of the acoustical vibrations. A disadvantage of this system is that the diaphragm spring is disposed between the ultrasonic transducer and the sonototrode, resulting in a significant loss of vibration energy into the mounting frame.

U.S. Pat. No. 6,613,717 to McNichols et al. discloses an ultrasonic method and apparatus including a rotatable ultrasonic horn member that is operatively joined to an isolation member. Two bearing support mounts can be employed to support the horn member in a spanning bridge configuration. The mounts may be positioned generally adjacent to a second node plane provided by a second axle member, and can fixedly hold and support a second rotatable coupler which supports a booster. A disadvantage of this system is that the booster is not a rigid booster located at a nodal mount. This results in a significant loss of vibration energy and high power requirements in order to produce a weld.

What is desired, therefore, is an ultrasonic welding tool that limits the loss of vibration energy into the frame of the tool, while providing precise tool location and maximum rigidity to the vibration welding tool. What is further desired, is an ultrasonic welding tool that requires relatively low power to produce a weld.

SUMMARY OF THE INVENTION

These and other objects of the present invention are achieved by provision of an ultrasonic tool having a sonotrode with a single weld region and two nodal regions formed on either side of the weld region. Two rigid mount boosters, one of the two rigid mount boosters are coupled to either side of the weld region. One transducer is coupled to one of the rigid mount boosters. Two ultrasonic stack mounting rings, each ultrasonic stack mounting ring is configured to be coupled to a housing assembly at a non-nodal region and coupled to one of the rigid mount boosters at a nodal region.

In some embodiments of the present invention, the two rigid mount boosters amplify an amplitude of vibrations of the sonotrode. In some embodiments of the present invention, one of the two rigid mount boosters changes a gain in the amplitude by a ratio of a mass of a region on a sonotrode side relative to a region on a transducer side of one of the two nodal regions. In some embodiments of the present invention, the sonotrode is a full wave acoustical tool. In some embodiments of the present invention, the rigid mount booster and the transducer are coupled using an interference fit. In some embodiments of the present invention, the non-nodal region is an anti-node.

In another embodiment of the present invention is an ultrasonic welder having an acoustical tool having a horn, the horn having a weld tip. Two rigid nodal mounts axially and radially support the horn. Two rigid boosters are mounted to the horn. A transducer is mounted to one of the two rigid boosters. Two mounting components, each of the two mounting components is configured to be coupled to a housing assembly at a non-nodal mount and coupled to one of the rigid nodal mounts.

In some embodiments of the present invention, the two rigid boosters amplify an amplitude of vibrations of the horn. In some embodiments of the present invention, one of the two rigid boosters changes a gain in the amplitude by a ratio of a mass of a region on a horn side to a region on a transducer side of one of the two rigid nodal mounts. In some embodiments of the present invention, the acoustical tool is a full wave acoustical tool. In some embodiments of the present invention, the transducer is mounted using an interference fit. In some embodiments of the present invention, the non-nodal mount is located at an anti-node.

In another embodiment of the present invention is an ultrasonic tool having a welding horn, a first rigid booster mounted on a first side of the welding horn at a first nodal mount, and a second rigid booster mounted on a second side of the welding horn at a second nodal mount, the second side being opposite the first side with respect to the welding horn. A transducer is mounted to the first rigid booster. A first ultrasonic stack mounting ring is configured to be coupled to a housing assembly at a non-nodal mount and coupled to the first rigid booster at a nodal mount. A second ultrasonic stack mounting ring is configured to be coupled to a housing assembly at a non-nodal mount and coupled to the second rigid booster at a nodal mount.

In some embodiments of the present invention, the first rigid booster and the second rigid booster amplify an amplitude of vibrations of the welding horn. In some embodiments of the present invention, the first rigid booster changes a gain in the amplitude by a ratio of a mass of a region on a welding horn side of the first nodal mount relative to a region on a transducer side of the first nodal mount. In some embodiments of the present invention, the welding tool is a full wave acoustical tool. In some embodiments of the present invention, the first rigid booster and the transducer are mounted using an interference fit. In some embodiments of the present invention, the non-nodal mount is located at an anti-node.

DETAILED DESCRIPTION OF THE INVENTION

Figure 1:
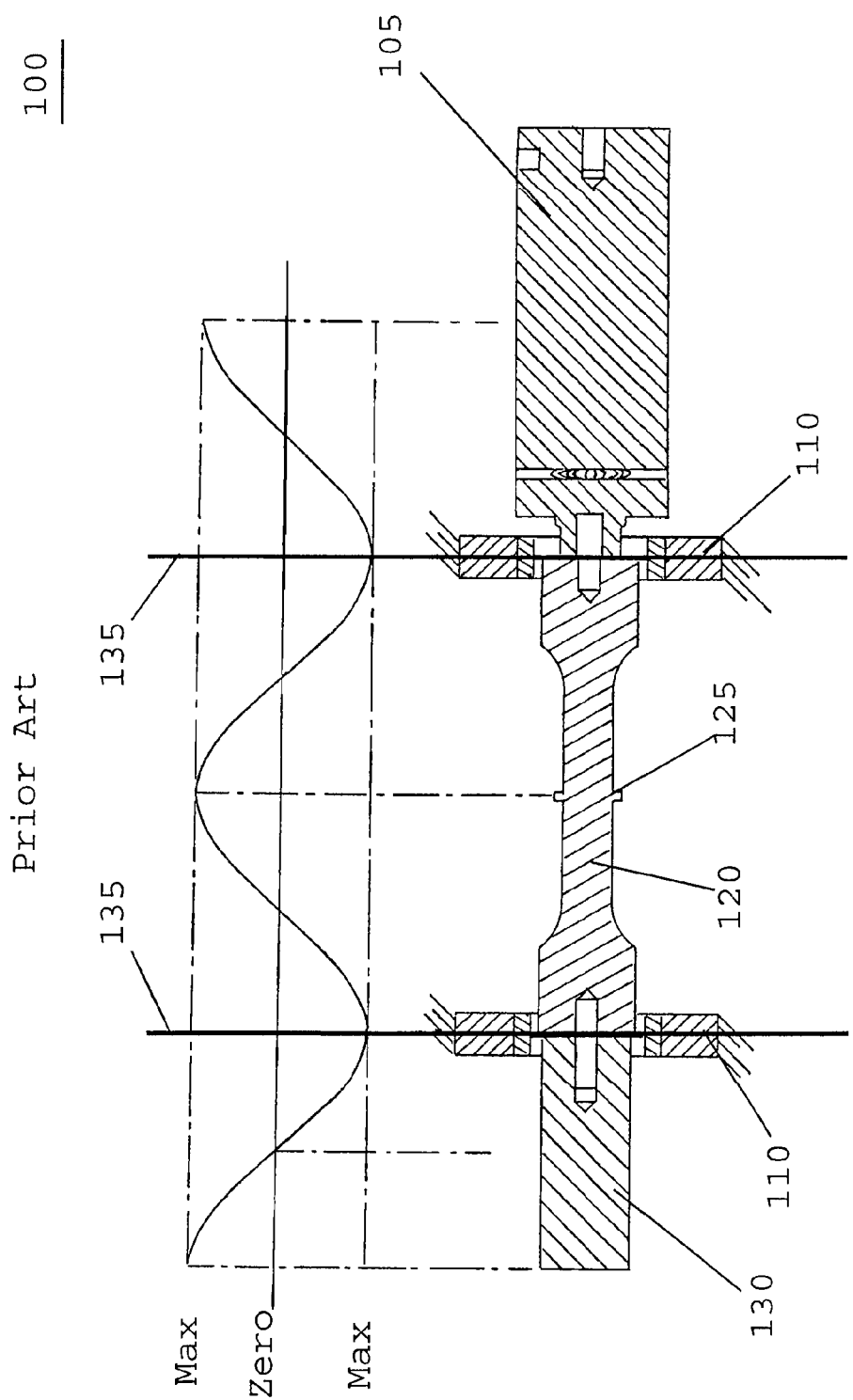
FIG. 1 shows a cross-sectional view of an ultrasonic welding tool according to the prior art.

The exemplary embodiments of the present invention may be further understood with reference to the following description and the related appended drawings, wherein like elements are provided with the same reference numerals. The exemplary embodiments of the present invention are related to an ultrasonic welding tool with improved energy loss prevention, precise tool location, and maximum rigidity to the vibratory welding tool.

As best seen in FIG. 1, a cross-sectional view of an ultrasonic welding tool 100 according to the prior art is shown. Ultrasonic welding tool 100 is mounted using a standard mounting means common in the prior art. Ultrasonic welding tool 100 has a converter 105 for converting electrical impulses into mechanical oscillations. Converter 105 is connected to a welding horn 120 having a welding tip 125. Ultrasonic welding tool 100 may further have a booster 130 for amplifying and subsequently inducing vibrations into the acoustical tool.

Welding horn 120 is mounted to converter 105 and to booster 130 using a pair of ultrasonic stack mounting rings 110 located at a plane of maximum amplitude 135. Each ultrasonic stack mounting ring 110 is a circular spring element that is sandwiched between the welding horn 120 and the booster 130 and the welding tool 120 and the converter 105. As the mounting of the components is located at a plane of the maximum amplitude 135, there is a significant loss of vibration energy into the mounting frame. This results in an inefficient use of the vibration energy, requiring greater power, and producing a weaker welding of the components to be welded (not shown).

Figure 2:
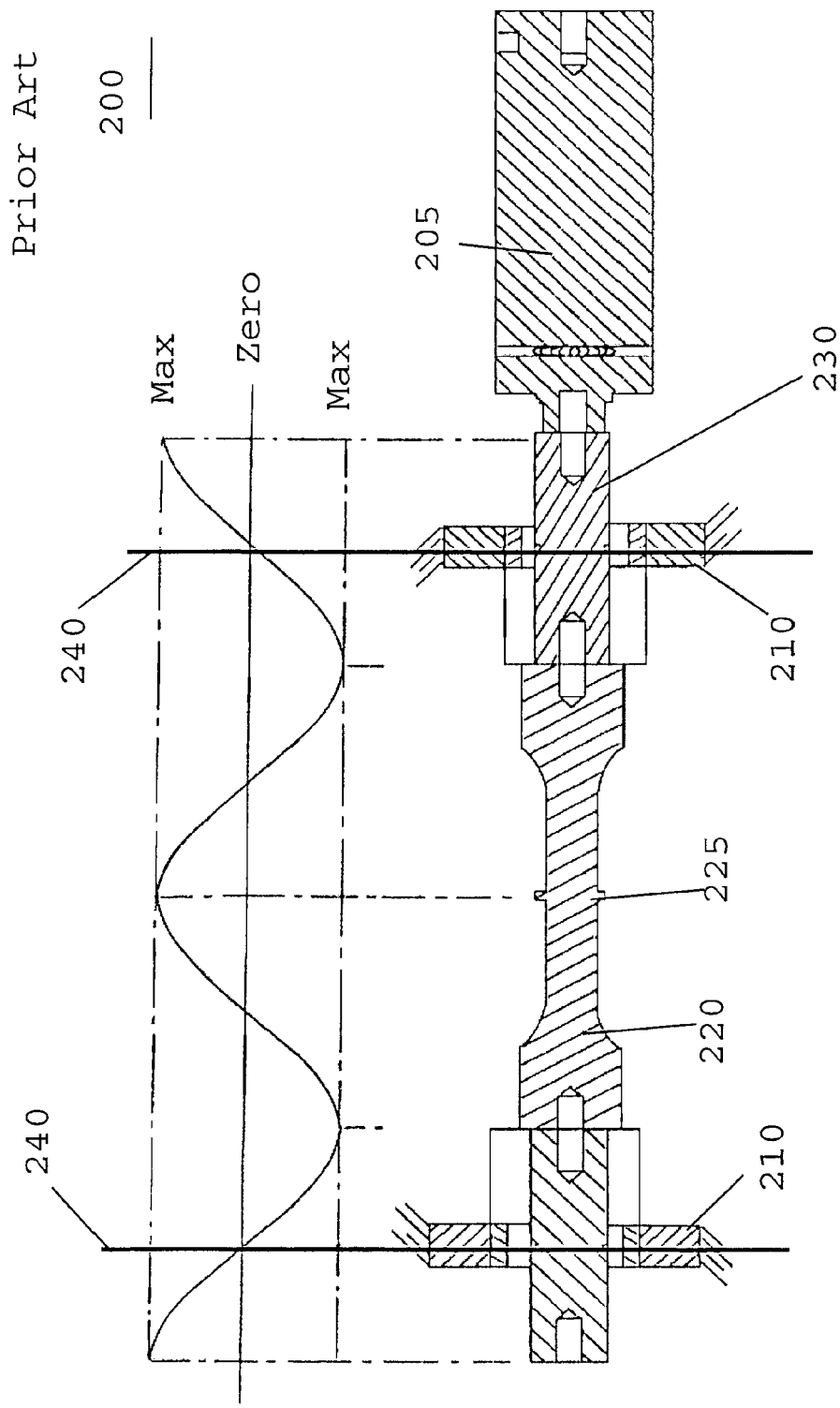
FIG. 2 shows a cross-sectional view of an ultrasonic welding tool according to another version of the prior art.

As best seen in FIG. 2, a cross-sectional view of an ultrasonic welding tool 200 according to another version of the prior art is shown. Ultrasonic welding tool 200 is mounted using a standard mounting means common in the prior art. Ultrasonic welding tool 200 has a converter 205 for converting electrical impulses into mechanical oscillations. Converter 205 is connected to a booster 230 which is connected to a welding horn 220 having a welding tip 225. Booster 230 is used to amplify and subsequently induce vibrations into the acoustical tool.

Welding horn 220 is mounted to booster 230 using a pair of ultrasonic stack mounting rings 210 located at a nodal plane 240. Each ultrasonic stack mounting ring 210 is a circular spring element used to mount welding horn 220 to booster 230. The mounting component mounts booster 230 to welding horn 220 at the nodal plane 240, and is also mounted to a housing assembly (Not Shown) at the nodal plane 240. As the mounting component is mounted to the housing at the nodal plane, there is no rigid mount of booster 230 to welding horn 220. This results in a loss of vibrational energy into the frame of ultrasonic welding tool 200. This further results in an inefficient use of the vibration energy, requiring greater power, and producing a weaker welding of the components to be welded (not shown).

Figure 3:
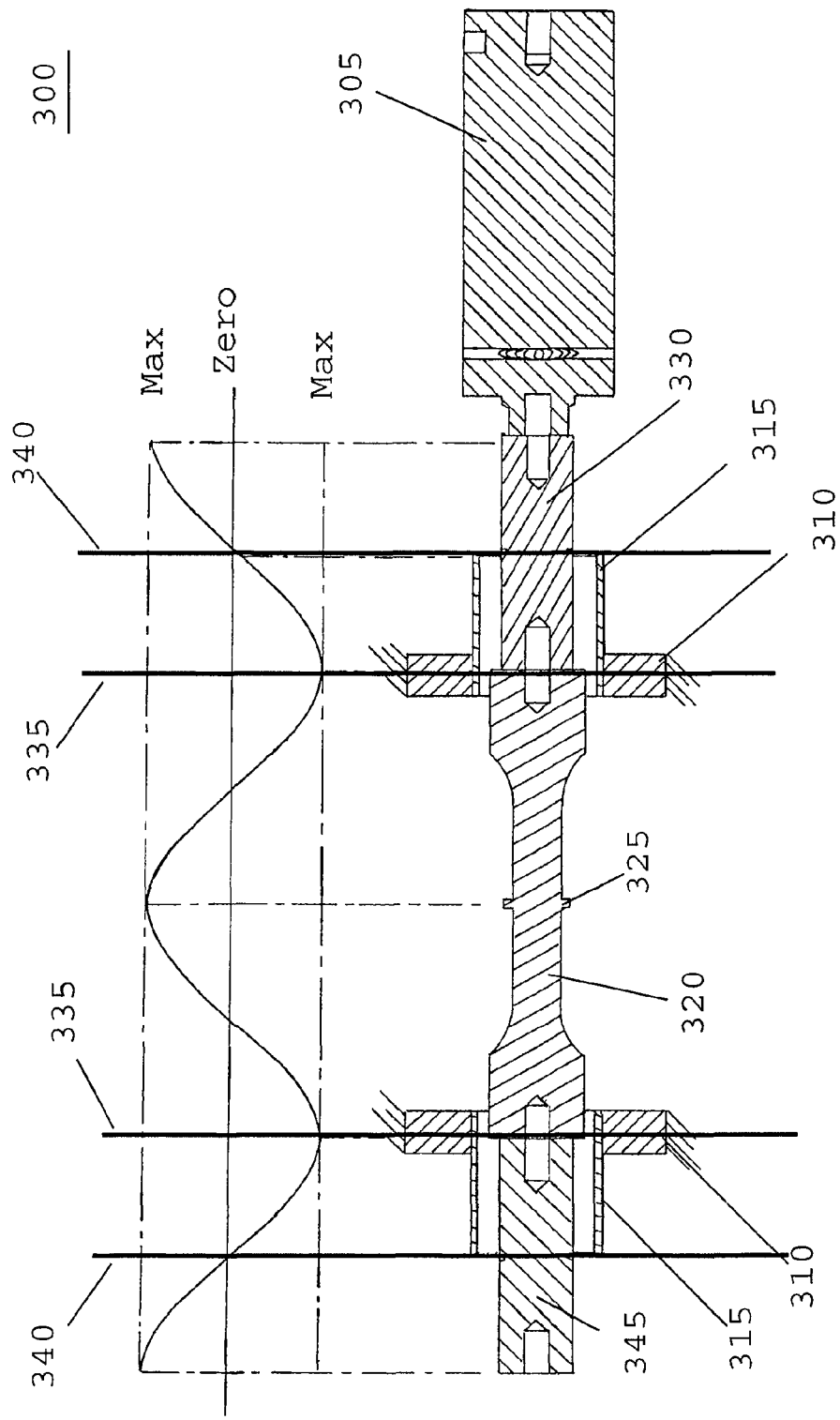
FIG. 3 shows a cross-sectional view of an ultrasonic tool according to the present invention
Figure 4:
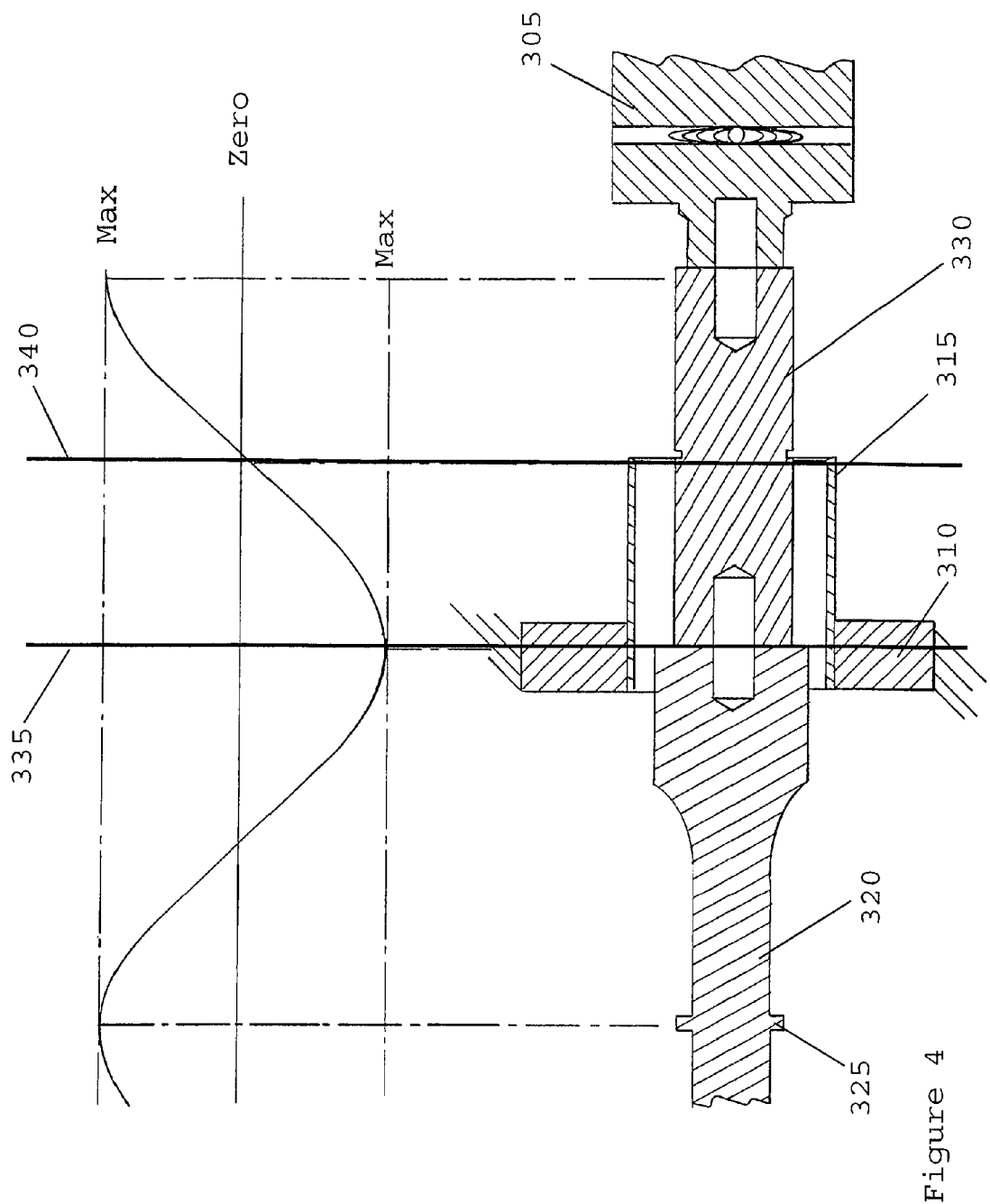
FIG. 4 shows a close-up cross-sectional view of the ultrasonic welding tool from FIG. 2.

As best seen in FIGS. 3 and 4, cross-sectional views of an ultrasonic tool 300 according to the present invention are shown. Ultrasonic welding tool 300 has improved energy loss prevention, precise tool location, and provides for maximum rigidity to the vibratory welding tool. Ultrasonic welding tool 300 has a converter 305 for converting electrical impulses into mechanical oscillations. Converter 305 may be a piezoelectric transducer or any other type of transducer. When electrical signals enter converter 305, they are converted into mechanical vibrations which are used to weld two components together. Converter 305 is connected to a rigid nodal mount booster 330. Booster 330 amplifies and induces vibrations into the welding horn 320. Booster 330 can also modify the amplitude of the vibration for greater efficiency in ultrasonic welding tool 300 which may produce a superior weld.

Booster 330 is connected to a welding horn, or sonotrode, 320, having a weld tip 325. The vibrational energy from the booster 330 is transmitted into the welding horn 320 which vibrates at a rapid pace to produce a weld. The combination of welding horn 320 and weld tip 325 support the parts to be welded and transmit ultrasonic energy and static force into the parts to be welded (Not shown). The weld tip 325 is usually machined as an integral part of a solid welding horn 320, however, weld tip 325 may be a separate component mounted on weld horn 320. Welding horn 320 is exposed to ultrasonic vibration and resonates in frequency as "contraction" and "expansion" x times per second, with x being the frequency. The amplitude is typically a few micrometers. For an ultrasonic welding application, welding horn 320 provides energy directly to the welding contact area, with little diffraction. This is particularly helpful when vibrations propagation could damage surrounding components.

Welding horn 320 is connected to a second rigid nodal mount booster 345 at an opposite side of welding horn 320 such that both boosters are opposite of each other with welding horn 320 between them. Second booster 345 operates similarly to booster 330, specifically modifying the amplitude in the same manner as booster 330 to produce a uniform vibration of welding horn 320. Welding horn 320 is mounted to booster 330 and second booster 345 using ultrasonic stack mounting rings 310. However, in contrast to the prior art above, the mounting of welding horn 320 to booster 330 and second booster 345 is done at a plane zero vibration 340, while also being mounted to a housing assembly (Not Shown) at a non-nodal plane. Ultrasonic stack mounting ring 310 is mounted to booster 330 at the nodal region 340 and is mounted to the housing assembly using an extension piece 315. Extension piece 315 extends ultrasonic stack mounting ring 310, which is mounted to the housing assembly at a non-nodal region, to the nodal plane 340, moving the point of mounting from the plane of maximum vibration 335 to the nodal plane 340. Moving the mounting of welding horn 320 from the plane of maximum vibration 335 to the plane of zero vibration 340, while mounted to a housing assembly at a non-nodal region, provides a significant advantage over the prior art. Ultrasonic stack mounting ring 310 is shown as being mounted to the anti-node, or plane of maximum vibration 335, however, it should be noted that ultrasonic stack mounting ring 310 may be mounted to a housing at any non-nodal plane.

This device has the advantage in that by mounting welding horn 320 between two rigid nodal mount booster 330 and 345, any loss of energy into the frame of ultrasonic welding tool 300 is eliminated. Further, more precise tool location can be achieved as well as maximum rigidity to ultrasonic welding tool 300. Additionally, the weld quality is improved as the variable amount of lost energy is eliminated. Finally, less power is required for each specific weld as there is no loss of energy.

It would be appreciated by those skilled in the art that various changes and modification can be made to the illustrated embodiment without departing from the spirit of the invention. All such modification and changes are intended to be covered hereby.

What is claimed is:

1. An ultrasonic tool comprising:
   a sonotrode having a single weld region and two nodal regions formed on either side of said weld region;
   two rigid mount boosters, one of said two rigid mount boosters coupled to either side of said weld region;
   one transducer coupled to one of said rigid mount boosters; and
   two ultrasonic stack mounting rings, each of said two ultrasonic stack mounting rings configured to be coupled to a housing assembly at a non-nodal region, each of said two ultrasonic stack mounting rings having an extension piece extending away from said sonotrode and coupled to one of said rigid mount boosters at a nodal region.

2. The ultrasonic tool of claim 1, wherein said two rigid mount boosters amplify an amplitude of vibrations of said sonotrode.

3. The ultrasonic tool of claim 2, wherein one of said two rigid mount boosters changes a gain in said amplitude by a ratio of a mass of a region on a sonotrode side relative to a region on a transducer side of one of said two nodal regions.

4. The ultrasonic tool of claim 1, wherein said sonotrode is a full wave acoustical tool.

5. The ultrasonic tool of claim 1, wherein said rigid mount booster and said transducer are coupled using an interference fit.

6. The ultrasonic tool of claim 1, wherein said non-nodal region is an anti-node.

7. An ultrasonic welder comprising:
   a horn having a first side, a second side and a welding tip;
   a first rigid booster mounted to the first side of said horn;
   a second rigid booster mounted to the second side of said horn;
   a transducer mounted to said first rigid booster; and
   a first rigid mount attached to a first nodal region of said first rigid booster, said first rigid mount extending toward said horn and coupled to a housing assembly at a first non-nodal region;
   a second rigid mount attached to a second nodal region of said second rigid booster, said second rigid booster extending toward said horn and coupled to the housing assembly at a second non-nodal region.

8. The ultrasonic welder of claim 7, wherein said first and said second rigid boosters amplify an amplitude of vibrations of said horn.

9. The ultrasonic welder of claim 8, wherein said first rigid booster changes a gain in said amplitude by a ratio of a mass of a region on a horn side to a region on a transducer side of said first rigid mount.

10. The ultrasonic welder of claim 7, wherein said horn is a full wave acoustical tool.

11. The ultrasonic welder of claim 7, wherein said transducer is mounted using an interference fit.

12. The ultrasonic welder of claim 7, wherein said first and said second non-nodal regions are anti-nodes.

13. An ultrasonic tool comprising:
   a welding horn;
   a first rigid booster mounted on a first side of said welding horn at a first non-nodal region;
   a second rigid booster mounted on a second side of said welding horn at a second non-nodal region, said second side being opposite said first side with respect to said welding horn;

a transducer mounted to said first rigid booster;
a first ultrasonic stack mounting ring configured to be coupled to a housing assembly at the first non-nodal region and coupled to said first rigid booster at a first nodal region;
a second ultrasonic stack mounting ring configured to be coupled to the housing assembly at the second non-nodal region and coupled to said second rigid booster at a second nodal region;
said first non-nodal region being closer to said horn than said first nodal region; and
said second non-nodal region being closer to said horn than said second nodal region.

14. The ultrasonic tool of claim 13, wherein said first rigid booster and said second rigid booster amplify an amplitude of vibrations of said welding horn.

15. The ultrasonic tool of claim 14 wherein said first rigid booster changes a gain in said amplitude by a ratio of a mass of a region on a welding horn side of said first nodal region relative to a region on a transducer side of said first nodal region.

16. The ultrasonic tool of claim 13, wherein said welding horn is a full wave acoustical tool.

17. The ultrasonic tool of claim 13, wherein said first rigid booster and said transducer are mounted using an interference fit.

18. The ultrasonic tool of claim 13, wherein said first and said second non-nodal regions are anti-nodes.

* * * * *